UNITED STATES PATENT OFFICE.

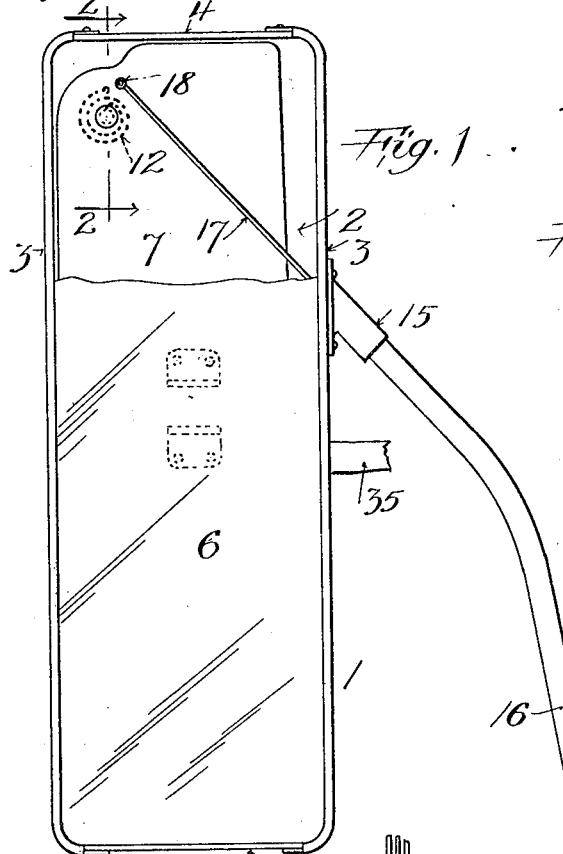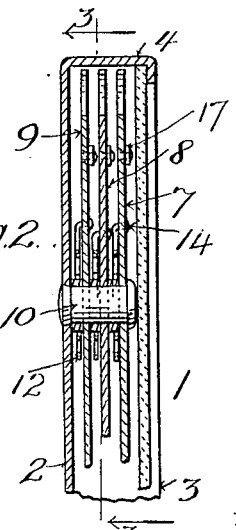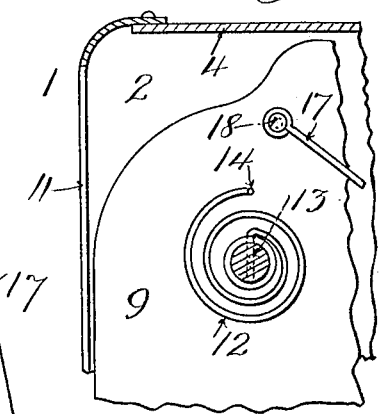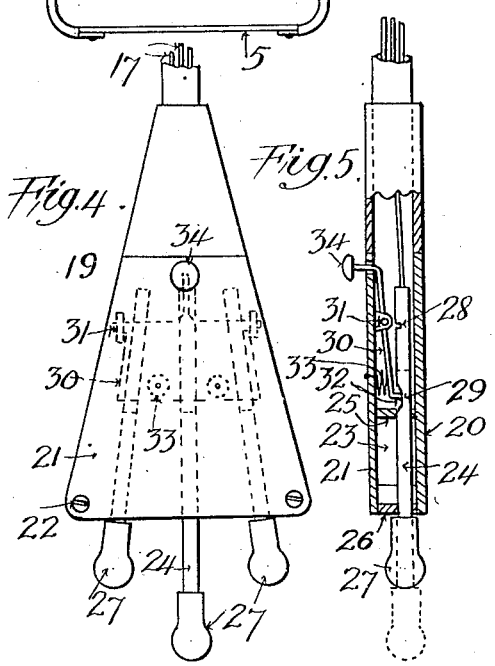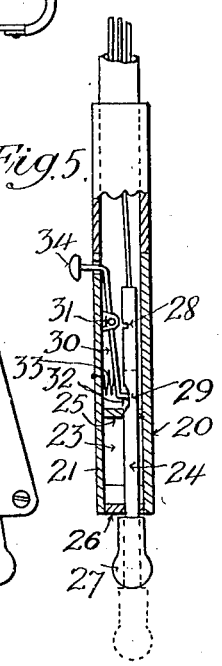

MAX H. NEWMAN, OF NEW YORK, N. Y., ASSIGNOR TO POLICE TRAFFIC AUTO SIGNAL CO., A CORPORATION OF NEW YORK.

AUTOMOBILE-SIGNAL.

1,292,855.  Specification of Letters Patent.  Patented Jan. 28, 1919.

Application filed October 25, 1917. Serial No. 198,412.

*To all whom it may concern:*

Be it known that I, MAX H. NEWMAN, a citizen of the United States, and a resident of the city, county, and State of New York, have invented certain new and useful Improvements in Automobile-Signals, of which the following is a specification.

The present invention relates to signal devices adapted for use on automobiles and other road vehicles. The device is useful as a means for signaling to a traffic officer when an automobile approaches a corner, so that the officer may be informed as to whether the autoist intends to continue straight ahead or to turn to the right or left, in order that the autoist may be instructed by the officer as to when and how to proceed. It is also adapted for signaling to vehicles behind, an intention to stop or turn to the right or left.

The object of my invention is to provide a very simple, compact and inexpensive device which may be readily attached by anyone to any vehicle whether it be of the open or closed type. The device is of the semaphore or movable signal type and the inclosure for the signal plates is not only very compact but the operating mechanism is reduced to the simplest and most convenient forms. Various other features of improvement will be pointed out in the detailed description hereinafter.

In the drawing forming part of this application,

Figure 1 is an elevation of my invention, with parts broken away to show the interior construction, Fig. 2 is a sectional view taken on the line 2—2 of Fig. 1, Fig. 3 is a sectional view taken on the line 3—3 of Fig. 2, Fig. 4 is an elevation of the control box, and Fig. 5 is an edge view thereof with the casing broken away to show the interior.

The casing 1, for inclosing the signal plates, comprises a front 2, end walls 3, a top 4, bottom 5 and of a mirror 6 forming the rear wall. The latter is intended for observation of approaching vehicles and it is intended to take the place of the separate observation mirrors generally used.

The signal plates, here shown as three in number 7, 8, 9, are all pivoted on a stud 10 secured in the casing, so that these signal plates may hang down from their support and be inclosed in the casing or they may be swung on their pivot to project from the casing in signaling position. One end of the casing is left open at 11 to allow the signal plates to swing into and out of the casing.

For each signal plate there is a coiled spring 12 surrounding the stud 10 and having one end 13 engaging an aperture in the stud and the other end 14 engaging in an aperture in a signal plate. Each spring is placed under tension when its signal plate is swung to signaling position and when a signal plate is released its spring serves to return it to closed position within the casing.

There is a casting 15 secured to the inner end of the casing and from this there extends a tube 16 whose direction is generally diagonal to the casing. There are wires or rods 17 arranged in the tube 16, and extending into the casing 1 and each wire is connected at one end to a signal plate at 18 which is preferably a point higher than the stud 10. It will be apparent that if one of these wires is moved lengthwise of the tube 16 and away from the casing that the corresponding signal plate will be swung on the stud 10 to open or signaling position; and, conversely, if a signal plate is returned by its spring to closed position its corresponding wire will be drawn in the tube 16 toward the casing. The position of the wires 17 and their attachment to the signal plates in the manner shown makes it possible to use small wires and to operate the signal plates with very little effort, and the direct operation of these wires on the signal plates makes it possible to eliminate all mechanism from the casing and to make the latter more compact.

The tube 16 is preferably metal, although it may be somewhat pliable in order that it may be bent to bring the control box in a convenient position for the driver of the automobile.

The control box 19 is attached to the free end of the tube 16. It comprises flaring or fan shaped front and rear plates 20, 21, the latter being detachably held by the screws 22, and of the end plates 23, all of which, except the plate 21 may be cast in one piece.

The wires 17 lead into the control box and each is connected with one end of a sliding bar 24. The latter slide in slots in a cross member 25 of the casing 19 and in slots in the end 26 of the box, and outside the box these slides have knobs 27. I provide means for locking the slides 24 in order that they may be securely held in position notwithstanding any jarring motion. Each slide has a notch 28 the notches in the several slides being preferably in line with each other, and each slide has a second notch 29 spaced from the first one a distance equal to the distance the slide is moved in operating the signal plates. There is a plate 30 pivoted at 31 and it has an engaging edge 32 which is adapted to enter the notches 28 or 29 according to the position of each slide. This rocking plate is pressed into the notches of the slides by means of a spring 33 and there is a knob or operating button 34 for operating the plate 30 and it projects through the casing where it will be accessible for operation. It is preferable that the plate 30 be arranged to lock all three slides 24 and that all slides may be unlocked or released by operating the single button 34, although I do not wish to limit this case to a common locking and releasing device for the several slides. It is to be understood that the casing 1 is to be attached to the automobile by a suitable bracket 35 so that it projects at one side of the windshield, one method of attachment being more fully shown in my Patent No. 1,208,625.

The several signal plates 7, 8, 9 will have the proper marking: One for instance, may be marked with the word "Stop" and the others, with the words "Right" and "Left," respectively. To give a signal the autoist pulls on one of the knobs 27 to draw down the corresponding slide 24. This will draw down one of the wires 17 and the latter will act on its signal plate, causing it to rock on the stud 10 in opposition to its spring 12. The signal plate will be swung out to a position at about right angle to the casing 1 and then the edge 32 of the locking plate 30 will enter the notch 28 of the slide which was operated and it will positively lock this slide in the position to which it has been moved. It may be desirable to operate another signal plate while the first one is still projected, as where one signal is to be given the vehicles behind and another to a traffic officer ahead. In that case another knob 27 is pulled down, thus swinging out another signal plate until it is locked by the engagement of the plate 30 with a notch 28 of the slide last operated.

The spring 12 of each signal plate which is thus operated is placed under tension. To release the signal plates, whether it be one or more, it is only necessary to press the button 34 and tilt the locking plate 30 in opposition to its spring 33. This will release the edge 32 from the notches 28 of all the slides 24. The signal plates which were projected are then no longer held up and they are returned by gravity and by the action of their respective springs 12. When the signal plates are returned, their respective wires and slides are also returned. When the knob 34 is released the plate edge 32 enters the notches 29 on all the slides and holds them in position. It will be noted that at least when a signal is projected its corresponding slide is positively locked by the plate 30 so that the signal plate can not be jarred down, and yet this lock so operates that while the signal plates are moving up or down it offers no resistance to their movement. It is very convenient to have all the signal plates released by a common releasing button.

If the casing 1 is attached to a closed automobile it is only necessary to provide an aperture in the automobile sufficiently large to receive the tube 16. The central box 19 may be supported only by the tube 16 or, if desired, it may be clamped to some convenient part of the automobile.

Having described my invention, what I claim is:

A signaling device of the class described, comprising a casing, swinging signal plates in said casing and adapted to be projected from the casing, springs for returning the signal plates, a tube projecting from said casing, wires for operating the signal plates and disposed in said tube, a controller box, on the free end of said tube, a slide connected with each of said wires and disposed in said controller box, means for operating said slides from without said controller box, said slides having notches, a pivoted member inclosed in said controller box for engaging the notches in said slides to lock them, and means operable from without the controller box for actuating said pivoted member to unlock said slides.

Signed at the city, county and State of New York this 8th day of October, 1917.

MAX H. NEWMAN.

Copies of this patent may be obtained for five cents each, by addressing the "Commissioner of Patents, Washington, D. C."